United States Patent
Watanabe et al.

(10) Patent No.: US 10,009,245 B2
(45) Date of Patent: Jun. 26, 2018

(54) COMMUNICATION SYSTEM, FAILURE CONTROL DEVICE, AND FAILURE CONTROL METHOD

(71) Applicant: FUJITSU LIMITED, Kawasaki-shi, Kanagawa (JP)

(72) Inventors: Yoshiharu Watanabe, Yokohama (JP); Tomoyuki Kanayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/809,737

(22) Filed: Jul. 27, 2015

(65) Prior Publication Data

US 2016/0057038 A1 Feb. 25, 2016

(30) Foreign Application Priority Data

Aug. 25, 2014 (JP) .................. 2014-170263

(51) Int. Cl.
*H04L 29/14* (2006.01)
*H04L 12/26* (2006.01)
(Continued)

(52) U.S. Cl.
CPC ........ *H04L 43/0847* (2013.01); *H04L 1/1835* (2013.01); *H04L 41/0659* (2013.01);
(Continued)

(58) Field of Classification Search
CPC .. H04L 1/1835; H04L 1/1874; H04L 41/0677
See application file for complete search history.

(56) References Cited

U.S. PATENT DOCUMENTS 5,703,870 A * 12/1997 Murase .................. H04L 47/10
370/232
6,563,822 B1 5/2003 Aoki
(Continued)

FOREIGN PATENT DOCUMENTS

JP 9-191321 7/1997
JP 2000-183873 6/2000
(Continued)

OTHER PUBLICATIONS

Japanese Office Action dated Mar. 20, 2018 in related Japanese Patent Application No. 2014-170263.

*Primary Examiner* — Hoon J Chung
(74) *Attorney, Agent, or Firm* — Staas & Halsey LLP

(57) ABSTRACT

A communication system includes: a first communication device configured to include first buffers to store data to be transmitted and received; a second communication device configured to include second buffers to store data to be transmitted and received; and a failure control device configured to include: an obtainment unit configured to obtain buffer usage state information to indicate a state of use of each of the first buffers and the second buffers from each of the first communication device and the second communication device; and an identification unit configured to identify a failure occurrence site on a channel, based on the obtained buffer usage state information, wherein the first communication device is configured to transmit and receive the data via the channel to and from the second communication device.

18 Claims, 11 Drawing Sheets

(51) Int. Cl.
*H04L 1/18* (2006.01)
*H04L 12/24* (2006.01)

(52) U.S. Cl.
CPC .......... *H04L 41/0677* (2013.01); *H04L 41/14* (2013.01); *H04L 43/0817* (2013.01)

(56) References Cited

U.S. PATENT DOCUMENTS

| | | | |
|---|---|---|---|
| 2005/0108444 A1 | 5/2005 | Flauaus et al. | |
| 2010/0067533 A1* | 3/2010 | Yoshida | H04L 43/0847 370/401 |
| 2015/0009823 A1* | 1/2015 | Ganga | H04L 47/2441 370/235 |

FOREIGN PATENT DOCUMENTS

| | | |
|---|---|---|
| JP | 2006-324729 | 11/2006 |
| JP | 2008-288740 | 11/2008 |
| JP | 2009-152977 | 7/2009 |
| JP | 2012-169957 | 9/2012 |
| WO | WO 2009/028185 A1 | 3/2009 |

* cited by examiner

COMMUNICATION SYSTEM, FAILURE CONTROL DEVICE, AND FAILURE CONTROL METHOD

CROSS-REFERENCE TO RELATED APPLICATION

This application is based upon and claims the benefit of priority of the prior Japanese Patent Application No. 2014-170263, filed on Aug. 25, 2014, the entire contents of which are incorporated herein by reference.

FIELD

The embodiment discussed herein is related to a communication system, a failure control device, and a failure control method.

BACKGROUND

There is a storage device that includes plural controller modules (CM) which are connected by a peripheral component interconnect express (PCIe) bus and are capable of mutual communication.

FIG. 11 is a diagram that illustrates the configuration of the CMs included in a storage device in related art. The example illustrated in FIG. 11 illustrates two CMs 300-1 and 300-2 that are included in the storage device.

The CMs 300-1 and 300-2 are provided for redundancy, and these CMs 300-1 and 300-2 have similar configurations. Hereinafter, as the reference numerals that denote the CMs, a reference numeral 300-1 or 300-2 will be used when it is desired to identify one of the plural CMs, but a reference numeral 300 will be used to denote an arbitrary CM. Further, the CM 300-1 may be referred to as CM #0, and the CM 300-2 may be referred to as CM #1.

The CM 300 is a control device that performs various kinds of control in the storage device and performs miscellaneous kinds of control such as access control to a memory device in accordance with a storage access request from a host device, which is not illustrated. The CM 300 includes a channel adapter (CA) 313, a central processing unit (CPU) 311, and a PCIe switch 312. The CA 313 is an interface controller that enables communication with the host device, which is not illustrated, and so forth.

The CPU 311 is a processing device that performs various kinds of control and computation. The CPU 311 is connected with the CA 313 and the PCIe switch 312 via the PCIe bus. For example, the CPU 311 of the CM 300-1 includes a port 401C and is connected with the PCIe switch 312 via the port 401C. Further, the CPU 311 of the CM 300-2 includes a port 401F and is connected with the PCIe switch 312 via the port 401F.

The PCIe switch 312 is a relay device that relays data transfer in accordance with a PCIe protocol. The PCIe switch 312 includes plural ports, and apparatuses that serve as transmission sources or transmission destinations of data are connected with those ports. In the example illustrated in FIG. 11, the PCIe switch 312 of the CM 300-1 includes two ports 401B and 401A. The PCIe switch 312 of the other CM 300-2 is connected with the port 401A. Further, the CPU 311 of the CM 300-1 is connected with the port 401B.

Similarly, the PCIe switch 312 of the CM 300-2 includes two ports 401D and 401E. The PCIe switch 312 of the other CM 300-1 is connected with the port 401D. Further, the CPU 311 of the CM 300-2 is connected with the port 401E.

Hereinafter, as the reference characters that denote the ports, reference characters 401A to 401F will be used when it is desired to identify one of the plural ports, but a reference numeral 401 will be used to denote an arbitrary port.

Each of the ports 401 includes a transmission circuit Tx and a reception circuit Rx. The transmission circuit Tx included in the port 401A will be denoted by a reference character Tx-A, and the reception circuit Rx included in the port 401A will be denoted by a reference character Rx-A. Similarly, the transmission circuits Tx included in the ports 401B to 401F will be denoted by reference characters Tx-B to Tx-F, respectively. Further, the reception circuits Rx included in the ports 401B to 401F will be denoted by reference characters Rx-B to Rx-F, respectively.

Further, each of the transmission circuit Tx and the reception circuit Rx includes a buffer and performs data communication by using the buffer. That is, the buffer is used to temporarily store data in transmission. Incidentally, when one or more buffers become full on the PCIe bus, no more data may be stored in the buffers, resulting in stagnation of communication processes.

For example, as denoted by a reference character P01 in FIG. 11, a case will be discussed where failure in which data may not be transmitted to the reception circuit Rx-D of the port 401D as the transmission destination occurs in the transmission circuit Tx-A of the port 401A of the PCIe switch 312. In such a case, the buffer of the transmission circuit Tx-A soon becomes full. As a result, data may not be transmitted from the reception circuit Rx-B of the port 401B to the transmission circuit Tx-A of the port 401A in the PCIe switch 312 of the CM #0. Fullness of the buffer spreads in the data communication path, the transmission circuit Tx-C of the CPU 311 of the CM #0 finally becomes full, and the CM #0 becomes a hang-up state.

As described above, for example, in a case where failure in which data may not be transmitted to the CM #1 as the transmission destination occurs in the CM #0, it is easy to identify the CM to be the target of maintenance work for solving the failure, that is, a maintenance-targeted CM as the CM #0. In other words, a failure occurrence site stays in a closed system that is the CM #0. Thus, the maintenance-targeted CM may easily be identified as the CM #0.

Further, in a case where the maintenance-targeted CM is identified, the maintenance-targeted CM is restarted (CM rebooting) or separated in order to restore the system.

However, there may be a case where it is difficult to identify the maintenance-targeted CM depending on the circumstance of an occurrence of failure. For example, as denoted by a reference character P02 in FIG. 11, such a circumstance may be a case where failure in which the transmission circuit Tx-D of the port 401D of the PCIe switch 312 of the CM #1 transmits data to the reception circuit Rx-A of the port 401A as the transmission destination but the reception circuit Rx-A may not process the data occurs.

In this case, because the transmission circuit Tx-D of the port 401D may not confirm completion of processing of the transmitted data, stagnation (time-out) of the communication between the CMs is finally detected, and a determination is made that the path between the CMs 300-1 and 300-2 has failure. However, in this case, both of the reception circuit Rx-A of the port 401A and the transmission circuit Tx-D of the port 401D may be considered as failure sites, and the maintenance-targeted CM may not be identified as the CM #0 or the CM #1.

As described above, in the storage device in related art, the CM rebooting or separation is performed in order to restore the system in a case where failure is detected in the CM. However, selecting a wrong CM as the maintenance-targeted CM may result in a system crash.

Japanese Laid-open Patent Publication No. 2008-288740, Japanese Laid-open Patent Publication No. 2000-183873, and Japanese Laid-open Patent Publication No. 9-191321 are examples of related art.

SUMMARY

According to an aspect of the invention, a communication system includes: a first communication device configured to include first buffers to store data to be transmitted and received; a second communication device configured to include second buffers to store data to be transmitted and received; and a failure control device configured to include: an obtainment unit configured to obtain buffer usage state information to indicate a state of use of each of the first buffers and the second buffers from each of the first communication device and the second communication device; and an identification unit configured to identify a failure occurrence site on a channel, based on the obtained buffer usage state information, wherein the first communication device is configured to transmit and receive the data via the channel to and from the second communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
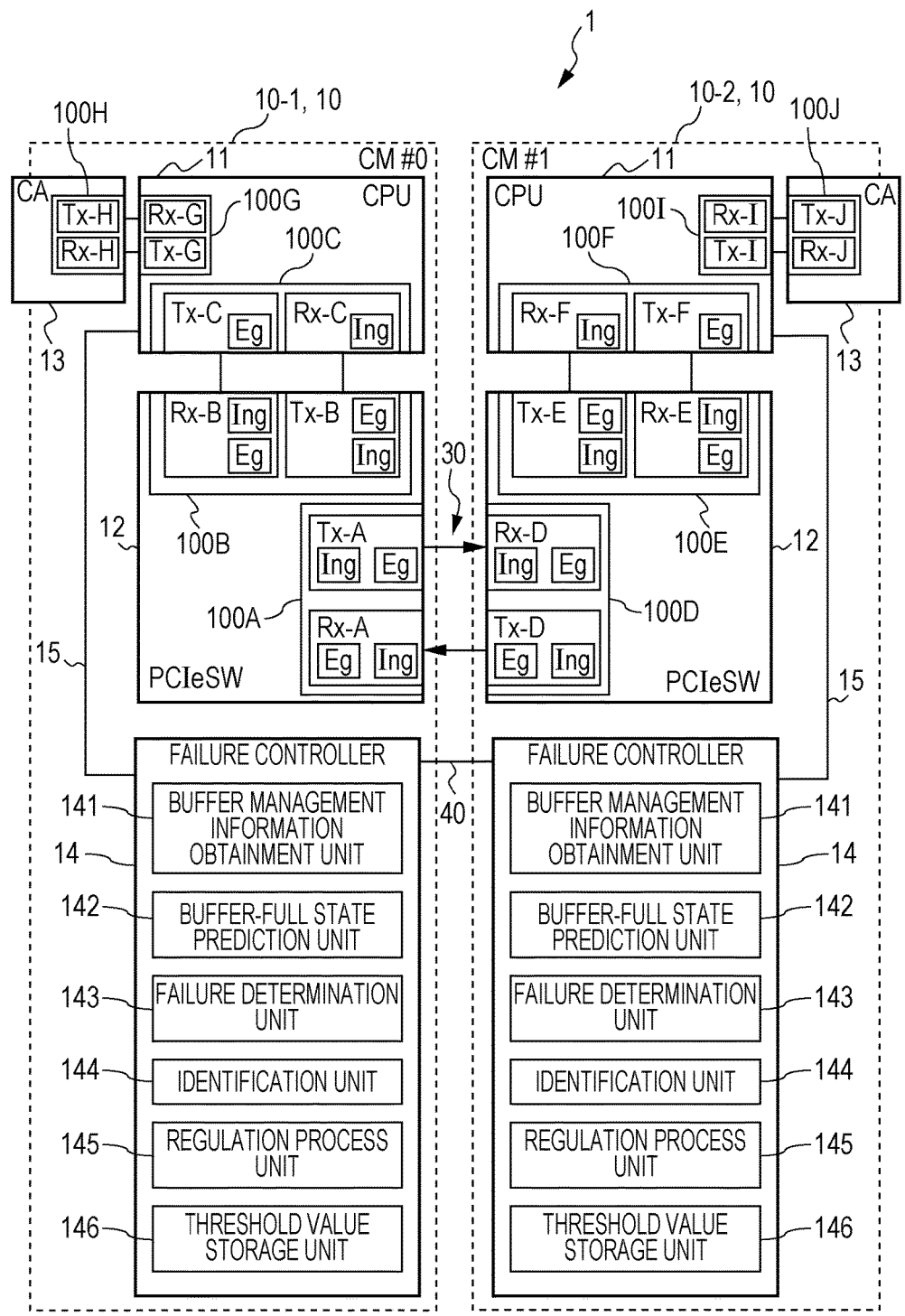
FIG. 1 is a diagram that schematically illustrates a function configuration of CMs included in a storage device as one example of an embodiment.

An embodiment related to a communication system, a failure control device, and a failure control method that facilitate identification of a failure occurrence site will be described hereinafter with reference to drawings. However, the embodiment described below is merely an example, and there is no intention to exclude various modifications and applications of techniques that are not described in the embodiment. That is, this embodiment may be practiced with various modifications without departing the gist thereof. Further, the drawings are not intended to include only elements that are illustrated in the drawings but may include other functions and so forth.

FIG. 1 is a diagram that schematically illustrates a function configuration of CMs included in a storage device as one example of the embodiment. As illustrated in FIG. 1, a storage device 1 of this embodiment includes plural (two in the example illustrated in FIG. 1) control devices (CMs) 10-1 and 10-2, a PCIe bus (channel) 30, and a memory device, which is not illustrated.

The memory device stores data in a readable and writable manner and is a hard disk drive (HDD), for example. In the storage device 1, redundant arrays of independent disks (RAID) may be configured by using plural memory devices. Hereinafter, the CM 10-1 may be referred to as CM #0, and the CM 10-2 may be referred to as CM #1. Hereinafter, a specific CM will be denoted as "CM 10-1", "CM #0", "CM 10-2", or "CM #1". However, an arbitrary CM will be denoted as "CM 10".

The CM #0 and the CM #1 are connected together via the PCIe bus 30 and are capable of communication. A communication system is configured with the CM #0, the CM #1, and the PCIe bus 30. The CM 10 is a control device that performs various kinds of control, performs miscellaneous kinds of control in accordance with a storage access request (access control signal) from a host device, which is not illustrated, and performs control of reading and writing of data with respect to the memory device, for example.

The CM #0 includes a CPU (computer) 11, a switch 12, and a CA 13. The CPU 11, the switch 12, and the CA 13 are connected together via a bus (PCIe bus) that conforms to the PCIe standard, for example. The CA 13 is an interface controller that enables communication between the host device, which is not illustrated, and the CM #0. The CA 13 includes a port 100H, is connected with the CPU 11 via the port 100H, and is capable of communication with the CPU 11.

The CA 13 receives data transmitted from the host device or the CPU 11 and passes the data to the CPU 11 or transmits the data received from the CPU 11 to the host device. That is, the CA 13 includes a function of controlling input and output (I/O) of data between the CA 13 and an external device such as the host device.

The CPU 11 is a processing device that performs various kinds of control and computation, executes an OS and programs stored in a memory, which is not illustrated, and thereby realizes various functions. The CPU 11 functions as a host control device that performs miscellaneous kinds of control in the CM 10 which includes the CPU 11. Further, the CPU 11 includes plural (two in the example illustrated in FIG. 1) ports 100C and 100G and is connected with the switch 12 via the port 100C and with the CA 13 via the port 100G. Further, when an interrupt signal (regulated mode notification) is input from a failure controller (failure control device) 14, which will be described below, to the CPU 11 via an interrupt signal line 15, the CPU 11 performs control to switch the operation mode to a regulated mode that reduces a buffer usage amount in the CM 10.

In this regulated mode, for example, the operating frequency of the CPU 11 is lowered, or the transfer rate of a transfer path is reduced. The reduction in the transfer rate of the transfer path is realized by changing the PCIe communication performed by using PCIe 3.0 (so-called Gen 3) to lower level communication that uses PCIe 1.1 (so-called Gen 1), PCIe 2.0 (so-called Gen 2), or the like, for example. Further, the number of lanes to be used for transfer is reduced in the transfer path, and the transfer rate of the transfer path may thereby be reduced. For example, in a case where four lanes are used to perform transfer, the number of lanes is changed to two, and the transfer rate is thereby reduced. Further, procedures for the reduction are not limited to those, but various procedures in related art may be used to reduce the transfer rate of the transfer path.

Further, when an interrupt notification that indicates buffer usage amount recovery is input from the failure controller 14 to the CPU 11 via the interrupt signal line 15, the CPU 11 cancels the regulated mode and switches the operation mode to an operation in a normal mode.

The switch 12 is a relay device that relays data transfer in accordance with a PCIe protocol and is a so-called PCIe switch. Hereinafter, the switch 12 may be referred to as PCIe switch (PCIe SW). The switch 12 includes plural ports (communication ports) 100, and apparatuses that serve as transmission sources or transmission destinations of data are connected with those ports 100. In the example illustrated in FIG. 1, the switch 12 includes two ports 100A and 100B. The switch 12 of the other CM 10 (CM #1) is connected with the port 100A. Further, the CPU 11 is connected with the port 100B.

Similarly to the CM #0, the CM #1 includes the CPU 11, the switch 12, and the CA 13. The CPU 11, the switch 12, and the CA 13 are connected together via a bus line, and communication is performed in accordance with the PCIe standard, for example.

In FIG. 1, the same reference characters as the reference characters that are already described denote similar portions. Thus, a detailed description thereof will not be made.

In the CM #1, the CA 13 includes a port 100J and is connected with the CPU 11 via the port 100J. Further, the CPU 11 includes ports 100F and 100I and is connected with the switch 12 via the port 100F and with the CA 13 via the port 100I. The switch 12 includes ports 100D and 100E. The switch 12 of the other CM 10 (CM #0) is connected with the port 100D, and the CPU 11 is connected with the port 100E.

Hereinafter, as the reference characters that denote the ports, reference characters 100A to 100J will be used when it is desired to identify one of the plural ports, but a reference numeral 100 will be used to denote an arbitrary port. Each of the ports 100 includes a transmission circuit Tx and a reception circuit Rx. The transmission circuit Tx included in the port 100A will be denoted by a reference character Tx-A, and the reception circuit Rx included in the port 100A will be denoted by a reference character Rx-A. Similarly, the transmission circuits Tx included in the ports 100B to 100J will be denoted by reference characters Tx-B to Tx-J, respectively. The reception circuits Rx included in the ports 100B to 100J will be denoted by reference characters Rx-B to Rx-J, respectively.

Further, each of the transmission circuit Tx and the reception circuit Rx includes a buffer, which is not illustrated. Data transmitted or received via the port 100 are stored in the buffers. Each of the buffers includes plural data storage areas. Data that are transmitted or received are sequentially stored in the plural data storage areas and are processed in FIFO order, for example.

Further, flow control based on the credit value is performed among the ports 100. In such flow control, the credit value (credit information) is used to control transmission and reception of a packet. A credit value is buffer usage state information that indicates the state of use of the buffer and is the buffer usage amount, for example. In the flow control based on the credit value, transmission of a packet is controlled in accordance with the processing state of a packet on the reception side. The credit value is used as the information that indicates the processing state of a packet on the reception side. The transmission side transmits data in accordance with the credit value. That is, the credit value functions as information that manages a data amount in a reception buffer (flow control information).

Each of the transmission circuits Tx and the reception circuits Rx includes registers (storage units) Ing and Eg. The credit value (credit information) is stored in each of the registers Ing and Eg. As described above, the credit values that are stored in the registers Ing and Eg function as the buffer usage state information that indicates the state of use of the buffer. Here, the register Ing stores an Ingress credit value. The Ingress credit value is buffer management information (credit information) for managing the usage amount of the buffer that temporarily stores data input to the transmission circuit Tx and the reception circuit Rx in each of the ports 100.

Here, the register Eg stores an Egress credit value. The Egress credit value is buffer management information (credit information) for managing the usage amount of the buffer (not illustrated) that temporarily stores data to be output from the transmission circuit Tx and the reception circuit Rx in each of the ports 100. Hereinafter, the Ingress credit value and the Egress credit value will simply be referred to as credit value.

Further, each of the CM #0 and the CM #1 has the failure controller 14. The failure controllers 14 included in the respective CMs 10 have similar configurations. The failure controller 14 detects a precursor of an occurrence of a buffer-full state (buffer depletion) in the ports 100 based on the credit values of the registers Ing and Eg included in the ports 100 in the CMs #0 and #1 and avoids an occurrence of the buffer-full state. Hereinafter, detection of the precursor of the occurrence of the buffer-full state will be referred to as prediction of the occurrence of the buffer-full state.

Further, in a case where the failure controller 14 predicts the occurrence of the buffer-full state in the port 100 and determines that the occurrence of the buffer-full state is due to hardware trouble, the failure controller 14 identifies the failure occurrence site and identifies the CM 10 to be the target of maintenance work, that is, a maintenance-targeted CM. Accordingly, the failure controller 14 functions as a failure control device that identifies the failure occurrence site in the PCIe bus 30 that connects the PCIe switches 12 together.

As illustrated in FIG. 1, the failure controller 14 includes a buffer management information obtainment unit 141, a buffer-full state prediction unit 142, a failure determination unit 143, an identification unit 144, a regulation process unit 145, and a threshold value storage unit 146. The failure controller 14 may be realized by large scale integration (LSI) that implements those functions, for example. Further, the failure controller 14 is connected with the failure controller 14 of the other CM 10 via a communication line 40 and is capable of communication. Hereinafter, the communication performed between the failure controller 14 of the CM #0 and the failure controller 14 of the CM #1 may be referred to as inter-LSI communication.

The failure controller 14 included in the CM #0 and the failure controller 14 included in the CM #1 exchange information such as a collection instruction of the credit values and the credit values collected by each of the failure controllers 14 by the inter-LSI communication. That is, the failure controller 14 included in the CM #0 collects the credit values in the CM #0, and the failure controller 14 of the CM #1 collects the credit values in the CM #1.

Further, the failure controller 14 included in the CM #0 transmits the collection instruction of the credit values to the failure controller 14 of the CM #1 via the inter-LSI communication. In response to this, the failure controller 14 of the CM #1 collects the credit values in the CM #1 and transmits the collected credit values to the failure controller 14 of the CM #0 via the inter-LSI communication. Similarly, the failure controller 14 included in the CM #1 transmits the collection instruction of the credit values to the failure controller 14 of the CM #0 via the inter-LSI communication. In response to this, the failure controller 14 of the CM #0 collects the credit values in the CM #0 and transmits the collected credit values to the failure controller 14 of the CM #1 via the inter-LSI communication.

The exchange of information such as the collection instruction of the credit values by the failure controllers 14 and the collected credit values will be described in detail below. The threshold value storage unit 146 is a storage unit that stores threshold values used in miscellaneous kinds of control in the failure controller 14 and stores an alarm threshold value Ta and an alarm cancellation threshold value Tac. Here, the alarm threshold value Ta is a threshold value that is used when the buffer-full state prediction unit 142, which will be described below, makes a determination about the precursor of the occurrence of the buffer-full state. This alarm threshold value Ta may arbitrarily be set by a user or may be decided by the system based on the record of the buffer usage amount in the storage device 1.

For example, as the alarm threshold value Ta, the value in a prescribed ratio (for example, 60%) to the maximum permissible amount (Bmax) of the buffer included in each of the ports 100 may be used. For example, in a case where the prescribed ratio is 60%, the alarm threshold value Ta may be obtained by Bmax×0.6. Further, as the alarm threshold value Ta, the value obtained by addition of a prescribed amount of a margin (for example, +10%) to the average value of the buffer usage amounts in the past (Bave) may be used. For example, in a case where the margin to be added is +10%, the alarm threshold value Ta may be obtained by Bave×1.1.

The alarm cancellation threshold value Tac is a threshold value that is used when the failure determination unit 143, which will be described below, makes a determination about an occurrence of failure. This alarm cancellation threshold value Tac may arbitrarily be set by a user or may be decided by the system. For example, as the alarm cancellation threshold value Tac, the value in a prescribed ratio to the maximum permissible amount (Bmax) of the buffer included in each of the ports 100 may be used. For example, in a case where 50% is used as the prescribed ratio, the alarm cancellation threshold value Tac may be obtained by Bmax×0.5.

Further, as the prescribed ratio, the value obtained by subtraction of a prescribed amount (for example, 10%) from the alarm threshold value Ta that is set for the concerned port 100 may be used. For example, in a case where 10% is used as the prescribed amount, the alarm cancellation threshold value Tac may be obtained by Ta×0.9. The prescribed value subtracted from the alarm threshold value Ta may be decided based on the record of the buffer usage amount in the storage device 1. For example, in a case where the ratio that the system estimates from the record of the buffer usage amounts is 5%, the alarm cancellation threshold value Tac may be obtained by alarm threshold value Ta×0.95.

The values used as the alarm threshold value Ta and the alarm cancellation threshold value Tac are not limited to the ones described above, but various modifications may be practiced. For example, the alarm threshold value Ta and the alarm cancellation threshold value Tac are in advance stored in an external memory, which is not illustrated, as preset values, read out from the memory when the failure controller 14 is started, and stored in the threshold value storage unit 146. Further, the threshold values may be written in the threshold value storage unit 146 of the failure controller 14 from another device such as the CPU 11 when the failure controller 14 is started. In the threshold value storage unit 146, the alarm threshold value Ta and the alarm cancellation threshold value Tac may be managed as a table, for example.

The buffer management information obtainment unit 141 reads out the credit values of the registers Ing and Eg of all the ports 100 of devices included in the CM #0 and the CM #1. Specifically, in the failure controller 14 included in the CM #0, the buffer management information obtainment unit 141 reads out the credit values of the registers Ing and Eg of all the ports 100 of the devices included in the CM #0. Further, in the failure controller 14 included in the CM #1, the buffer management information obtainment unit 141 reads out the credit values of the registers Ing and Eg of all the ports 100 of the devices included in the CM #1.

That is, the buffer management information obtainment unit 141 functions as an obtainment unit that obtains the buffer usage state information (credit information) of each of the buffers of the respective ports 100 of the devices included in the CM #0 and the CM #1. Further, the credit value obtained in each of the failure controller 14 is transmitted to the other failure controller 14 via the inter-LSI communication.

That is, the credit value obtained by the buffer management information obtainment unit 141 in the failure controller 14 included in the CM #0 is transmitted to the failure controller 14 of the CM #1 via the inter-LSI communication. Further, the credit value obtained by the buffer management information obtainment unit 141 in the failure controller 14 included in the CM #1 is transmitted to the failure controller 14 of the CM #0 via the inter-LSI communication.

The buffer-full state prediction unit (buffer-full state precursor detection unit) 142 predicts the occurrence of the buffer-full state (credit depletion) in each of the buffers based on each of the credit values obtained by the buffer management information obtainment unit 141. The buffer-full state prediction unit 142 compares the credit values of the registers Ing and Eg obtained by the buffer management information obtainment unit 141 with the preset alarm threshold value Ta (first threshold value) and detects the precursor of the occurrence of the buffer-full state in a case where any of the credit values exceeds the alarm threshold value Ta. That is, the buffer-full state prediction unit 142 predicts the occurrence of the buffer-full state. Hereinafter, the case where the credit value exceeds the alarm threshold value Ta may be referred to as alarm threshold value exceedance.

The regulation process unit (buffer usage regulation process unit) 145 switches the CPUs 11 of the CMs 10 into an operation mode in which the buffer usage amount is regulated (regulated mode) when the buffer-full state prediction unit 142 predicts the occurrence of the buffer-full state. Specifically, the regulation process unit 145 inputs the interrupt signal (regulated mode notification) that indicates the alarm threshold value exceedance to the CPU 11 in the same CM 10 via the interrupt signal line 15. The regulation process unit 145 notifies the CPU 11 of information that identifies the port 100 in which the threshold value exceedance is detected together with the regulated mode notification.

Further, the regulation process unit 145 performs a notification indicating that the alarm threshold value exceedance is detected to the failure controller 14 of the other CM 10 via the inter-LSI communication. The regulation process unit 145 of the failure controller 14 of the other CM 10 that receives this notification transmits the interrupt signal (regulated mode notification) to the CPU 11 in the same CM 10 via the interrupt signal line 15. The regulation process unit 145 notifies information that identifies the port 100 in which the threshold value exceedance is detected together with the notification indicating that the alarm threshold value exceedance is detected to the failure controller 14 of the other CM 10 via the inter-LSI communication.

In addition, the regulation process unit 145 performs the regulated mode notification to the CPU 11 and sets information such as a flag that the CM 10 is operating in the regulated mode in a memory or the like, which is not illustrated, in a case where the CM 10 is operating in the regulated mode. As described above, the regulation process unit 145 has a function of managing whether or not the CM 10 is operating in the regulated mode.

In a case where the above-described buffer-full state prediction unit 142 predicts the occurrence of the buffer-full state, the failure determination unit 143 determines whether the buffer-full state occurs due to an overload or due to any other failure such as hardware trouble.

The failure determination unit 143 monitors the credit values of the registers Ing and Eg included in the port 100 in which the alarm threshold value exceedance is detected by the buffer-full state prediction unit 142, that is, the port 100 in which the occurrence of the buffer-full state is predicted. Specifically, the failure determination unit 143 reads out the credit values of the registers Ing and Eg for plural times (for example, three times) at regular intervals. The interval and frequency for reading out the credit values may appropriately be changed or may arbitrarily be set by the user.

The failure determination unit 143 compares each of the credit values obtained at the regular intervals with the alarm cancellation threshold value Tac. Then, in a case where all the plural credit values obtained at the regular intervals are the alarm cancellation threshold value Tac or smaller, the failure determination unit 143 determines that the buffer usage amount decreases and determines that the risk of the occurrence of the buffer-full state is removed in the port 100.

In a case where the risk of the occurrence of the buffer-full state is removed after the CPU 11 of the same CM 10 operates in the regulated mode in which the buffer usage amount is regulated in response to the notification from the regulation process unit 145, a determination may be made that the buffer-full state is due to process stagnation caused by an overload in the CM 10. Further, in a case where at least one of the plural credit values obtained at the regular intervals is larger than the alarm cancellation threshold value Tac (which may hereinafter be referred to as negative determination), the credit values at the regular intervals are again obtained, and the obtained credit values are compared with the alarm cancellation threshold value Tac. This is because a decrease in the buffer usage amount is expected while the time elapses under the regulated mode. That is, the failure determination unit 143 determines that the risk of the occurrence of the buffer-full state is removed based on a result of successive monitoring of the credit values.

Further, in a case where the result of the comparison between the above-described credit values of the registers Ing and Eg and the alarm cancellation threshold value Tac is continuously a negative determination for a prescribed frequency (for example, five times) or more, a determination is made that a time-out has occurred. That is, the state that is determined as a time-out may be said to be a state where the buffer usage amount does not decrease even if the CPU 11 keeps operating in the regulated mode in which the buffer usage amount is regulated for a prescribed time or longer. The frequency of the negative determination for the determination of a time-out may appropriately be changed or may arbitrarily be set by the user.

The failure determination unit 143 determines that the risk of the occurrence of the buffer-full state is not removed based on the result of successive monitoring of the credit values.

In a case where the risk of the occurrence of the buffer-full state is not removed even if the CPU 11 operates in the regulated mode in which the buffer usage amount is regulated and a prescribed time elapses, a determination may be made that hardware trouble has occurred in any portion of the CM 10, data processing thereby stagnates, and the buffer usage amount increases.

As described above, the failure determination unit 143 samples the credit values at each prescribed time lapse for the port 100 in which the occurrence of the buffer-full state is predicted, successively monitors the credit values, and thereby determines that hardware trouble has occurred in the storage device 1. That is, in a case where the failure determination unit 143 compares the credit values in the port 100 that are obtained after a prescribed time elapses with the alarm cancellation threshold value Tac with respect to the port 100 in which the occurrence of the buffer-full state is predicted by the buffer-full state prediction unit 142 and detects that the credit value is larger than the alarm cancellation threshold value Tac, the failure determination unit 143 makes a determination about an occurrence of failure related to the port 100.

Hereinafter, the port 100 in which the occurrence of the buffer-full state is predicted by the failure determination unit 143 may be referred to as failure predicted port 100. Further, the failure predicted port 100 and the port 100 that is connected with the failure predicted port 100 via a communication path may be referred to as failure predicted port pair.

The identification unit 144 identifies the failure occurrence site in a case where the failure determination unit 143 determines that hardware trouble has occurred. The identification unit 144 identifies the failure occurrence site based on the credit values of the registers Ing and Eg included in each of the ports 100.

Figure 2:
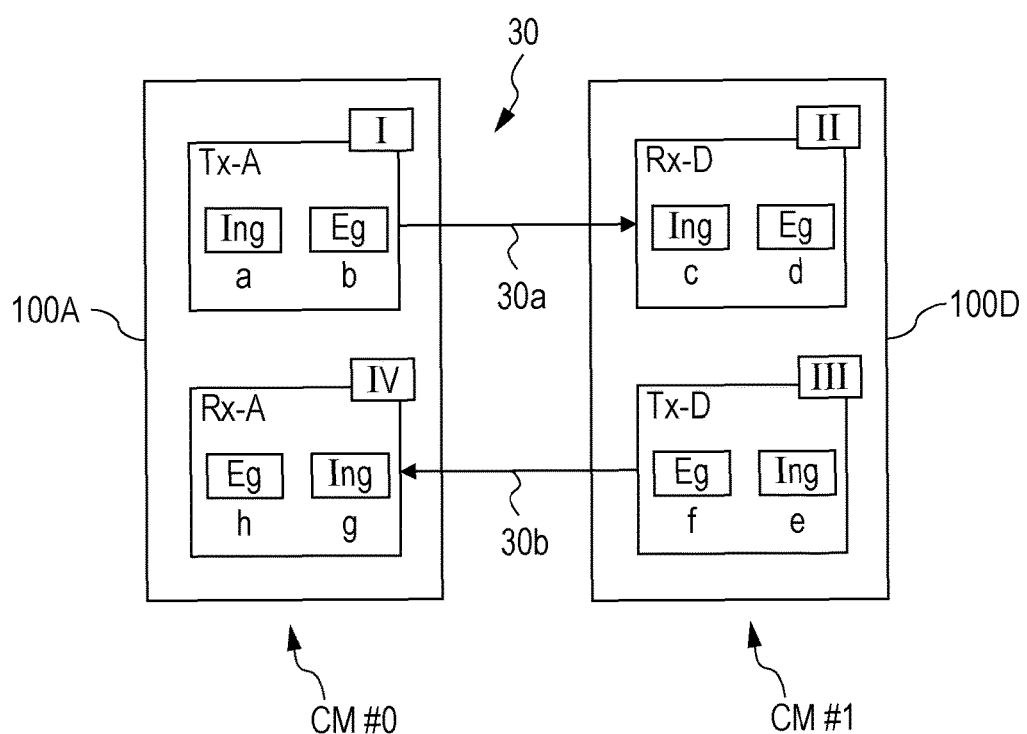
FIG. 2 is a diagram for explaining an identification method of a failure occurrence site by an identification unit of the storage device as one example of the embodiment.

FIG. 2 is a diagram for explaining an identification method of the failure occurrence site by the identification unit 144 of the storage device 1 as one example of the embodiment and schematically illustrates a configuration of the two ports 100 connected via the PCIe bus 30. That is, FIG. 2 illustrates a configuration of the failure predicted port pair. FIG. 2 illustrates the port 100A and the port 100D that are connected via the PCIe bus 30 as an example, and the ports 100A and 100D configure the failure predicted port pair. The port 100A is included in the switch (first device) 12 of the CM #0, and the port 100D is included in the switch (second device) 12 of the CM #1. Further, in the example illustrated in FIG. 2, for convenience, the transmission circuit Tx-A, the reception circuit Rx-D, the transmission circuit Tx-D, and the reception circuit Rx-A are denoted as circuit I, circuit II, circuit III, and circuit IV, respectively.

Further, in the CM #0, the respective values that are stored in the registers Ing and Eg included in the transmission circuit Tx-A are denoted by reference characters a and b, and the respective values that are stored in the registers Ing and Eg included in the reception circuit Rx-A are denoted by reference characters g and h. Similarly, in the CM #1, the respective values that are stored in the registers Ing and Eg included in the reception circuit Rx-D are denoted by reference characters c and d, and the respective values that are stored in the registers Ing and Eg included in the transmission circuit Tx-D are denoted by reference characters e and f.

Further, the PCIe bus 30 enables bidirectional communication and includes communication paths 30a and 30b. In the example illustrated in FIG. 2, the transmission circuit Tx-A of the port 100A and the reception circuit Rx-D of the port 100D are connected together via the communication path 30a. The transmission circuit Tx-D of the port 100D and the reception circuit Rx-A of the port 100A are connected together via the communication path 30b. The communication path 30a may be referred to as first direction path 30a, and the communication path 30b may be referred to as second direction path 30b.

The identification unit 144 identifies the failure occurrence site based on the credit values of the registers Ing and Eg included in the failure predicted port pair, which are obtained by the buffer management information obtainment unit 141. Further, the identification unit 144 performs (a) identification of failure path and (b) identification of trouble occurrence site as identification of the failure occurrence site, as described below.

(a) Identification of Failure Path

The identification unit 144 identifies the communication path in which the failure has occurred based on the credit values of the transmission circuit Tx and the reception circuit Rx included in the failure predicted port 100, with respect to the failure predicted port 100 in which the buffer-full state prediction unit 142 detects that the credit value exceeds the alarm threshold value Ta.

The identification unit 144 compares the credit values of the registers Ing and Eg included in the failure predicted port 100 and the port 100 connected with the failure predicted port 100 via the communication path with the alarm threshold value Ta. As a result, in a case where the credit value of any of the registers Ing and Eg that are included in the transmission circuit Tx-A and the reception circuit Rx-D related to the communication path 30a is larger than the alarm threshold value Ta, the identification unit 144 determines that failure has occurred in the communication path 30a. Further, in a case where the credit value of any of the registers Ing and Eg that are included in the transmission circuit Tx-D and the reception circuit Rx-A related to the communication path 30b is larger than the alarm threshold value Ta, the identification unit 144 determines that failure has occurred in the communication path 30b.

Details of the identification method of the failure path by the identification unit 144 will be described with reference to the flowchart illustrated in FIG. 8.

(b) Identification of Trouble Occurrence Site

Further, the identification unit 144 identifies the CM 10 in which failure has occurred and which is to be the target of the maintenance work, that is, the maintenance-targeted CM 10 based on the credit values of the registers Ing and Eg included in the identified failure path.

Specifically, the identification unit 144 compares the credit value of the register Eg of the transmission circuit Tx with the credit value of the register Ing of the reception circuit Rx, the transmission circuit Tx and the reception circuit Rx which configure the failure path. Then, as a result of the comparison, in a case where the credit value of the register Ing of the reception circuit Rx is the credit value of the register Eg of the transmission circuit Tx or larger, the identification unit 144 identifies the CM 10 on the reception side as the maintenance-targeted CM 10. For example, in the example illustrated in FIG. 2, a determination is made that failure has occurred in the communication path 30b, the identification unit 144 compares the credit value f of the register Eg of the transmission circuit Tx-D with the credit value g of the register Ing of the reception circuit Rx-A.

As a result of the comparison, in a case of f=g or f<g, the identification unit 144 identifies the CM #0 as the maintenance-targeted CM 10. That is, the identification unit 144 identifies the maintenance-targeted CM 10 based on a magnitude relationship between the credit value of the register Eg of the transmission circuit Tx and the credit value of the register Ing of the reception circuit Rx, the transmission circuit Tx and the reception circuit Rx which configure the failure path.

Here, in the case of f=g, a determination may be made that data transmission from the transmission circuit Tx-D to the reception circuit Rx-A may be performed but data may not be passed from the buffer of the register Ing(g) to the buffer of the register Eg(h) in the reception circuit Rx-A. Accordingly, the CM #0 is the maintenance targeted CM.

Further, in the case of f<g, a determination may be made that the transmission circuit Tx-D receives a notification indicating that data processing in the reception circuit Rx-A is completed but the credit of the register Ing is still in use in the reception circuit Rx-A. Accordingly, the CM #0 is the maintenance targeted CM.

In the case of f>g, the maintenance-targeted CM 10 may not be identified. This is because such an f>g circumstance occurs in two cases indicated below by (i) and (ii).

(i) A case where the buffer (h) of the register Ing may receive data but may not process the data in the reception circuit Rx-A. In this case, it may be considered that failure has occurred in the reception circuit Rx-A and the CM #0 is in trouble.

(ii) A case where the transmission circuit Tx-D transmits data but the reception circuit Rx-A may not successfully receive the data. In this case, there may be a case where failure has occurred in the transmission circuit Tx-D and the CM #1 is in trouble and a case where some failure has occurred in the communication path 30b between the CMs 10.

As described above, in the case of f>g, all of the CMs #0 and #1 and the communication path 30b may be considered as the failure occurrence site, and the maintenance-targeted CM 10 may not be identified.

The identification unit 144 preferably identifies either one of the CMs 10 as the maintenance-targeted CM in accordance with a preset system design specification in a case where the maintenance-targeted CM 10 may not be identified by the above-described procedure. For example, another maintenance-targeted CM determination procedure such as assuming the CM 10 on the slave side as the maintenance-targeted CM may be used. Further, a separation process or a rebooting process is performed for the maintenance-targeted CM 10 that is identified by the identification unit 144. The separation or rebooting of the CM 10 may be realized by procedures in related art, and a description thereof will not be made.

Figure 3:
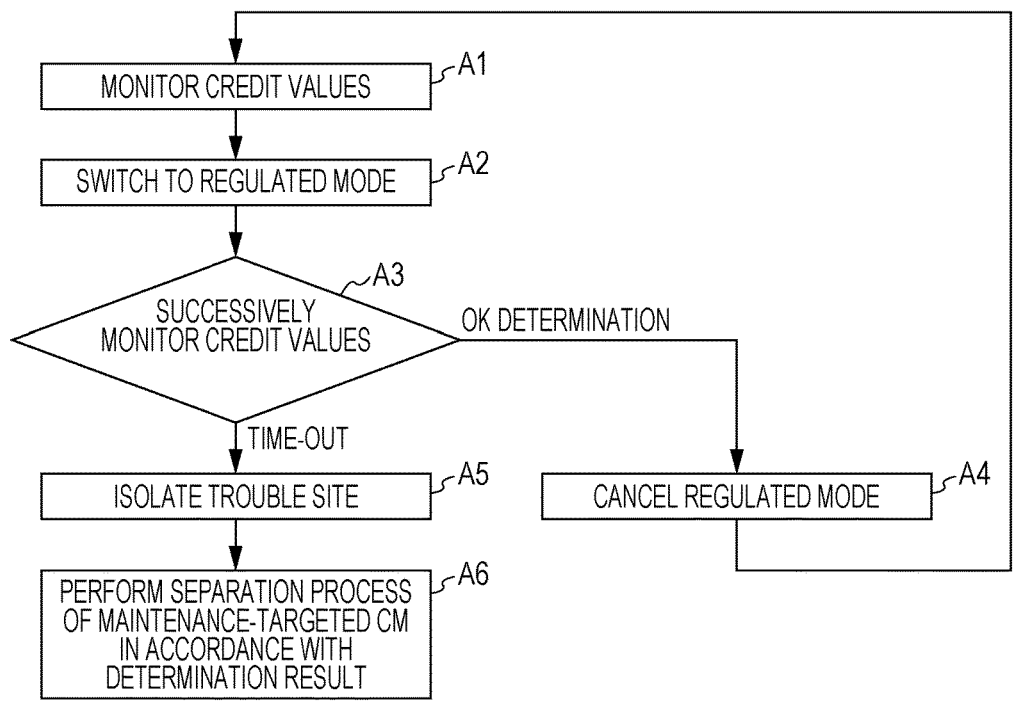
FIG. 3 is a flowchart that explains an outline of processing of a failure controller of the storage device as one example of the embodiment.

An outline of processing of the failure controller 14 of the storage device 1 configured as described above as one example of the embodiment will be described following the flowchart (operations A1 to A6) illustrated in FIG. 3.

In operation A1, the failure controller 14 periodically reads out the credit values of the registers Ing and Eg of the ports 100 of the devices included in the CM 10 and confirms whether there is the risk of the occurrence of the buffer-full state. That is, the failure controller 14 monitors the credit values of the registers Ing and Eg of the ports. Details of this process will be described below with reference to FIG. 4.

In a case where the occurrence of the buffer-full state is predicted, that is, the risk of depletion of the credit arises, in operation A2, the failure controller 14 switches the CM 10 into the regulated mode. Details of this process will be described below with reference to FIG. 5.

Thereafter, the failure determination unit 143 successively monitors the credit values for the port 100 in which the occurrence of the buffer-full state is predicted by the buffer-full state prediction unit 142 in operation A1 (operation A3). The failure determination unit 143 monitors the credit values and thereby determines whether or not the risk of the occurrence of the buffer-full state is removed. Details of this process will be described below with reference to FIG. 6.

In a case where the risk of the occurrence of the buffer-full state is removed as a result of successive monitoring of the credit values (see OK determination route in operation A3), in operation A4, the switching of the CM 10 into the regulated mode in operation A2 is canceled. Details of this process will be described below with reference to FIG. 7. The processing thereafter returns to the process of operation A1.

On the other hand, in a case where the risk of the occurrence of the buffer-full state is not removed as a result of successive monitoring of the credit values (see "time-out" route in operation A3), the failure determination unit 143 determines that hardware trouble has occurred, and the identification unit 144 identifies (isolates) the failure occurrence site in operation A5.

Thereafter, in operation A6, the separation process or the rebooting process is performed for the identified maintenance-targeted CM 10.

In the storage device 1, at the point when the occurrence of the buffer-full state is predicted, that is, before the buffer-full state actually occurs, a determination is made that hardware trouble occurs, the maintenance-targeted CM 10 is identified, and the separation process or the like of the maintenance-targeted CM 10 is performed.

In the above processing, the processing is started at the stage where the occurrence of the buffer-full state is predicted, and the buffer-full state is yet to occur. Thus, a system crash does not occur even in a case where the determination result of the maintenance-targeted CM 10 is wrong. Further, the communication between the CMs (PCIe communication) becomes a link disconnected state at the point when one of the CMs 10 is separated, and the buffer of the other CM 10 is released. This also enables avoidance of the occurrence of the buffer-full state.

Figure 4:
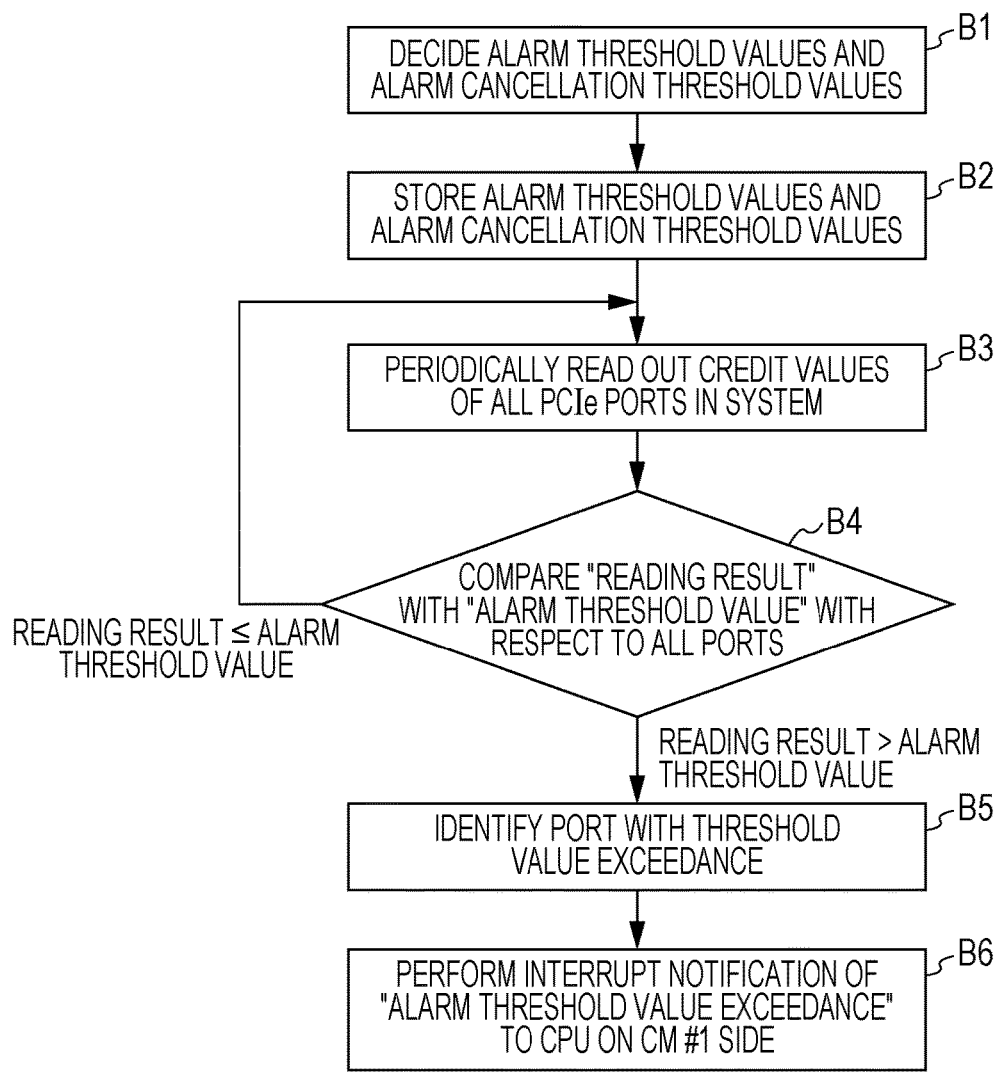
FIG. 4 is a flowchart for explaining a monitoring procedure of a credit value by the failure controller in the storage device as one example of the embodiment.

Next, the monitoring procedure of the credit values by the failure controller 14 of the storage device 1 as one example of the embodiment will be described following the flowchart (operations B1 to B6) illustrated in FIG. 4.

In operation B1, the alarm threshold values Ta and the alarm cancellation threshold values Tac are decided for all the ports 100 of PCIe devices. These alarm threshold values Ta and the alarm cancellation threshold values Tac may arbitrarily be set by the user or may be calculated by the failure controller 14 based on the record of use in the past.

The alarm threshold value Ta and the alarm cancellation threshold value Tac that are decided are stored in the threshold value storage unit 146 (operation B2).

In operation B3, the buffer management information obtainment unit 141 periodically reads out the credit values of the registers Ing and Eg of all the PCIe ports 100 in the system. The sampling intervals of the credit values may arbitrarily be decided by the user. For example, the interval may be changed in accordance with the transfer rate of each of the transfer paths, or a uniformly common interval may be set for all the ports 100.

In operation B4, the read-out credit values are compared with the alarm threshold values Ta with respect to all the ports 100. As a result of the comparison, in a case where the read-out credit values are the alarm threshold values Ta or smaller (see "reading result alarm threshold value" route in operation B4), the determination is made that the buffers of the all the ports 100 have sufficient spaces, and the processing returns to operation B3.

Further, in a case where the read-out credit values are larger than the alarm threshold values Ta (see "reading result>alarm threshold value" route in operation B4), the determination is made that the buffers have insufficient spaces, and the processing moves to operation B5.

In operation B5, the buffer-full state prediction unit 142 identifies the port in which the read-out credit value larger than the alarm threshold value Ta (which may hereinafter be referred to as threshold value exceedance) is detected. Hereinafter, an example will be described where the alarm threshold value exceedance is detected in the port 100D of the PCIe switch 12 of the CM #1.

In operation B6, the regulation process unit 145 included in the CM 10 (CM #1) performs an interrupt notification that indicates the alarm threshold value exceedance to the host control device (CPU 11) in the CM 10 (CM #1) that includes the port 100 in which the threshold value exceedance is detected. In this notification, the regulation process unit 145 also notifies the host control device of the port 100 in which the threshold value exceedance is detected.

Figure 5:
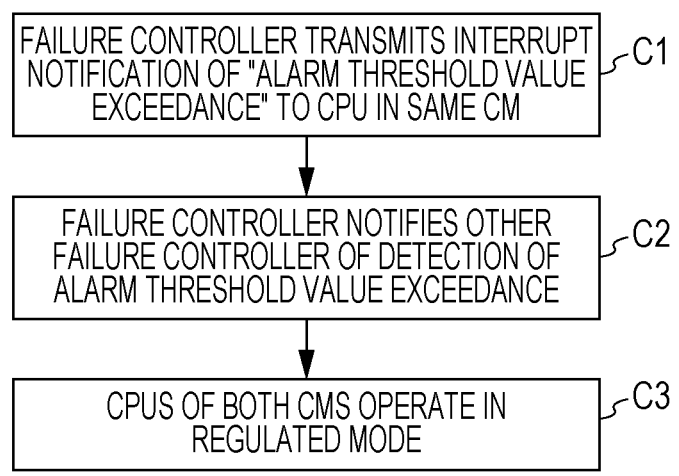
FIG. 5 is a flowchart for explaining switching processing to a regulated mode in the storage device as one example of the embodiment.

Next, the switching processing to the regulated mode in the storage device 1 as one example of the embodiment will be described following the flowchart (operations C1 to C3) illustrated in FIG. 5.

In the failure controller 14 that detects the alarm threshold value exceedance, the regulation process unit 145 transmits the interrupt signal (regulated mode notification) to the CPU 11 included in the same CM (for example, the CM #1) via the interrupt signal line 15 (operation C1).

Further, the regulation process unit 145 performs a notification indicating that the alarm threshold value exceedance is detected to the failure controller 14 of the other CM (for example, the CM #0) via the inter-LSI communication (operation C2). The regulation process unit 145 of the failure controller 14 of the other CM #0 that receives this notification transmits the interrupt signal (regulated mode notification) to the CPU (host control device) 11 in the same CM #0 via the interrupt signal line 15.

The CPUs 11 of both of the CMs #0 and #1 that receive the regulated mode notification operate in the regulated mode in which the buffer usage amounts are regulated (operation C3).

Next, the successive monitoring procedure of the credit values by the failure determination unit 143 of the storage device 1 as one example of the embodiment will be described following the flowchart (operations D1 to D5) illustrated in FIG. 6.

This processing is started after each of the CMs 10 starts operating in the regulated mode in operation A2 of FIG. 3 and is performed in the CM 10 (the CM #1 in the following example) in which the occurrence of the buffer-full state is predicted by the buffer-full state prediction unit 142.

In operation D1, the failure determination unit 143 monitors the credit values of the registers Ing and Eg included in the port 100, in which the precursor of the buffer-full state is detected by the buffer-full state prediction unit 142.

In operation D2, the failure determination unit 143 reads out the credit values of the registers Ing and Eg included in the port 100 in which the alarm threshold value exceedance is detected by the buffer-full state prediction unit 142 for plural times (for example, three times) at regular intervals.

In operation D3, the reading results are compared with the alarm cancellation threshold value Tac. As a result of the comparison, in a case where at least one of the credit values that is larger than the alarm cancellation threshold value Tac is detected (see "negative determination" route in operation D3), the processing returns to operation D2, and the credit values are again obtained at the regular intervals.

Further, as a result of the comparison, in a case where all the plural read-out credit values are the alarm cancellation threshold value Tac or smaller (see "OK determination" route in operation D3), a determination may be made that the buffer usage amount decreases and the risk of the occurrence of the buffer-full state is removed in the port 100.

In operation D4, the failure controller 14 of the CM #1 performs the interrupt notification that indicates the buffer usage amount recovery to the host control device (CPU 11) in the CM #1.

Further, in a case where the above-described comparison continuously results in the negative determination for a prescribed frequency (for example, five times) or more (see "time-out" route in operation D3), the failure determination unit 143 determines that a time-out has occurred (operation D5). The processing performed after the failure determination unit 143 makes a determination of time-out will be described with reference to FIG. 8.

Figure 7:
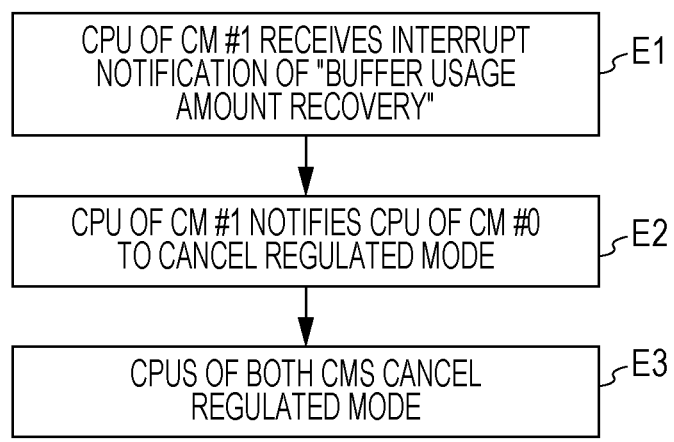
FIG. 7 is a flowchart for explaining cancellation processing of the regulated mode in the storage device as one example of the embodiment.

Next, cancellation processing of the regulated mode in the storage device 1 as one example of the embodiment will be described following the flowchart (operations E1 to E3) illustrated in FIG. 7. In the following description, an example will be described where the interrupt notification that indicates the buffer usage amount recovery is transmitted from the failure controller 14 of the CM #1.

When the CPU 11 of the CM #1 receives the interrupt notification that indicates the buffer usage amount recovery from the failure controller 14 (operation E1), the CPU 11 notifies the CPU 11 of the other CM 10 (CM #0) to cancel the regulated mode (operation E2). This notification is performed via the PCIe bus 30, for example. The notification about cancellation of the regulated mode is not limited to the notification via the PCIe bus 30, but various modifications may be practiced. For example, the notification about cancellation of the regulated mode may be performed by using the inter-LSI communication.

The CPUs 11 of both of the CMs #0 and #1 cancel the regulated mode and switch the operation mode to the operation in the normal mode (operation E3).

Next, the identification method of the failure path by the identification unit 144 of the storage device 1 as one example of the embodiment will be described following the flowchart (operations F1 to F8) illustrated in FIG. 8 with reference to FIG. 2.

In the following description, an example will be described where failure occurs in the communication between the CM #0 and the CM #1.

Figure 6:
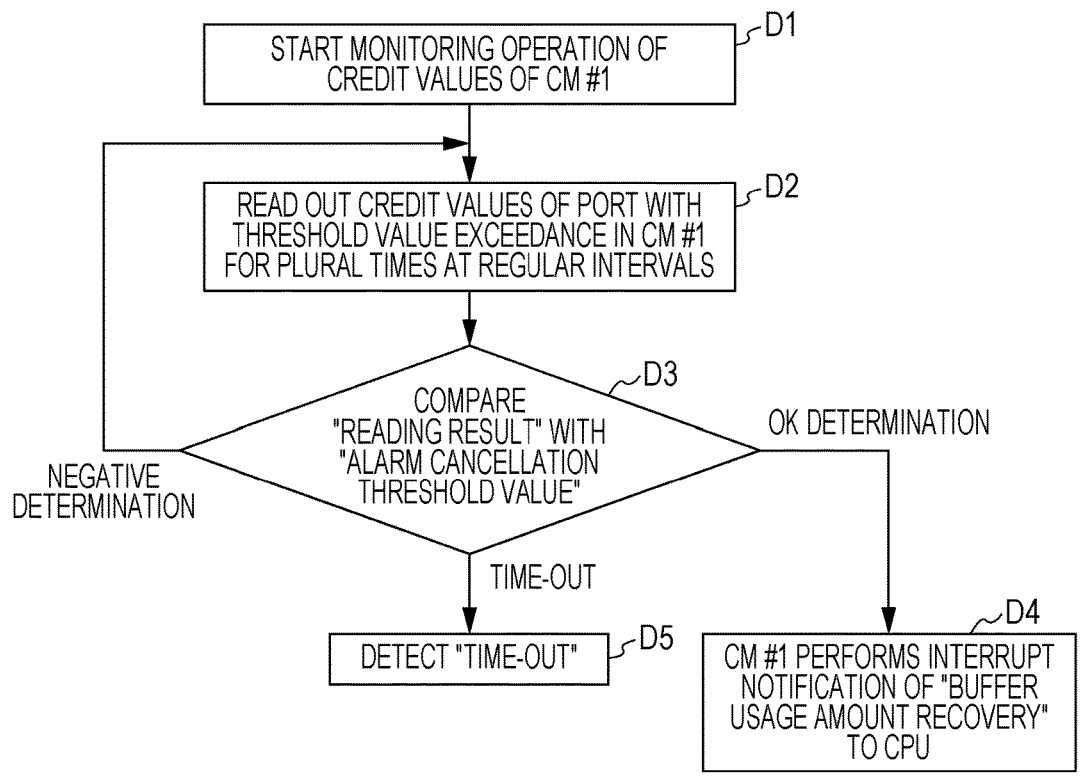
FIG. 6 is a flowchart for explaining successive monitoring processing of the credit value by the failure determination unit in the storage device as one example of the embodiment.

In operation F1, the failure controllers 14 (identification units 144) of the CMs #0 and #1 start identifying the failure path with respect to the failure predicted port pair that includes the failure predicted port 100 about which the failure determination unit 143 makes a determination of time-out (see operation D5 in FIG. 6).

In operation F2, in the failure controllers 14 (buffer management information obtainment units 141) of the CMs #0 and #1 read out the credit values of the registers Ing and Eg included in the failure predicted port pair.

Here, in the example illustrated in FIG. 2, the buffer management information obtainment unit 141 of the failure controller 14 of the CM #0 reads out the credit values (a, b, g, and h) of the registers Ing and Eg of the transmission circuit Tx-A (circuit I) and the reception circuit Rx-A (circuit IV) of the port 100A. Further, the buffer management information obtainment unit 141 of the failure controller 14 of the CM #1 reads out the credit values (c, d, e, and f) of the registers Ing and Eg of the transmission circuit Tx-D (circuit III) and the reception circuit Rx-D (circuit II) of the port 100D.

In operation F3, the identification unit 144 of the failure controller 14 of the CM #0 compares each of the credit values (a, b, g, and h) of the registers Ing and Eg of the transmission circuit Tx-A and the reception circuit Rx-A of the port 100A with the alarm threshold value Ta. Further, the identification unit 144 of the failure controller 14 of the CM #1 compares each of the credit values (e, f, c, and d) of the registers Ing and Eg of the transmission circuit Tx-D and the reception circuit Rx-D of the port 100D with the alarm threshold value Ta.

As a result of the comparisons, in a case where the credit values (a, b, g, and h) of the registers Ing and Eg of the transmission circuit Tx-A or the reception circuit Rx-D that is connected with the first direction path 30a of the PCIe bus 30 exceed the alarm threshold value Ta (see "in case where reading result on "I-II" side exceeds alarm threshold value" route in operation F3), the processing moves to operation F4. That is, the identification unit 144 determines that the failure site is present in the first direction path 30a from the CM #0 to the CM #1.

The identification unit 144 sets the credit values of the registers Ing and Eg of the transmission circuit Tx-A and the credit values of the registers Ing and Eg of the reception circuit Rx-D as comparison targets (operation F5) and identifies the trouble occurrence site by using those credit values. Details of the identification method of the trouble occurrence site will be described below with reference to FIG. 9.

On the other hand, in a case where the credit values (e, f, g, and h) of the registers Ing and Eg of the transmission circuit Tx-D or the reception circuit Rx-A that is connected with the second direction path 30b of the PCIe bus 30 exceed the alarm threshold value Ta (see "in case where reading result on "III-IV" side exceeds alarm threshold value" route in operation F3), the processing moves to operation F6. That is, the identification unit 144 determines that the failure site is present in the second direction path 30b from the CM #1 to the CM #0.

The identification unit 144 sets the credit values of the registers Ing and Eg of the transmission circuit Tx-D and the credit values of the registers Ing and Eg of the reception circuit Rx-A as comparison targets (operation F7) and identifies the trouble occurrence site by using those credit values. Details of the identification method of the trouble occurrence site will be described below with reference to FIG. 9.

Further, in a case where both of the credit values (a, b, h, and g) of the registers Ing and Eg of the transmission circuit Tx-A or the reception circuit Rx-D that is connected with the first direction path 30a of the PCIe bus 30 and the credit values (e, f, g, and h) of the registers Ing and Eg of the transmission circuit Tx-D or the reception circuit Rx-A that is connected with the second direction path 30b exceed the alarm threshold value Ta (see "in case where reading results on both of "I-II" side and "III-IV" side exceed alarm threshold value" route in operation F3), the processing moves to operation F8. That is, it is assumed that the failure path is unidentified, and a stepwise failure path identification is performed. Details of this stepwise failure path identification procedure will be described below with reference to FIG. 10.

Next, identification processing of the trouble occurrence site by the identification unit 144 of the storage device 1 as one example of the embodiment will be described following the flowchart (operations G1 to G10) illustrated in FIG. 9 with reference to FIG. 2. In the following description, an example will be described where the failure site occurs in the second direction path 30b from the CM #1 to the CM #0. Further, in the following example, it is assumed that the CM #0 mainly performs processing and the CM #1 subordinately performs processing.

In operation G1, the failure controller 14 (buffer management information obtainment units 141) of one of the CMs 10 transmits a reading instruction of the credit values to the failure controller 14 of the other CM 10. This starts a synchronization process between the CMs 10. For example, the failure controller 14 of the CM #1 transmits the reading instruction of the credit values (a, b, g, and h) of the circuits I and IV included in the CM #0 to the failure controller 14 of the CM #0.

In operation G2, the failure controller 14 that receives the reading instruction of the credit values transmits the reading instruction of the credit values to the failure controller 14 of the CM 10, which is the transmission source of the instruction, in response to the instruction. This completes the synchronization process between the CMs 10. For example, the failure controller 14 of the CM #0 transmits the reading instruction of the credit values (c, d, e, and f) of the circuits II and III included in the CM #1 to the failure controller 14 of the CM #1.

The CM #0 responds to the CM #1 with the reading instruction, those CMs 10 are thereby synchronized for credit value sampling, and this response also functions as a response that indicates the reading instruction from the CM #1 is normally received. In the above example, the failure controller 14 of the CM #1 first transmits the reading instruction to the failure controller 14 of the CM #0. However, the failure controller 14 of the CM #0 may first transmit the reading instruction to the failure controller 14 of the CM #1, and various modifications may be practiced. Further, the user may arbitrarily set the failure controller 14 of which CM 10 first transmits the reading instruction to the other failure controller 14.

In operation G3, the failure controllers 14 of the CMs #0 and #1 simultaneously read out the credit values of the target circuits for plural times (for example, three times) at regular intervals. The interval and frequency for reading out the credit values may appropriately be changed or may arbitrarily be set by the user.

In operation G4, the failure controller 14 of the CM #1 transmits the reading results of the credit values (c, d, e, and f) of the circuits II and III included in the CM #1 to the failure controller 14 of the CM #0. That is, the failure controller 14 of one of the CM 10 that subordinately performs the processing transmits the read-out credit values to the other failure controller 14 that mainly performs the processing.

In operation G5, the failure controller 14 of the CM #0 receives the reading results of the credit values (c, d, e, and f) of the circuits II and III included in the CM #1 from the failure controller 14 of the CM #1. That is, the failure controller 14 of the CM 10 that mainly performs the processing receives the credit values from the failure controller 14 that subordinately performs the processing.

In operation G6, the identification unit 144 of the failure controller 14 of the CM 10 that mainly performs the processing compares the credit value of the register Eg of the transmission circuit Tx with the credit value of the register Ing of the reception circuit Rx, the transmission circuit Tx and the reception circuit Rx which configure the failure path.

For example, the identification unit 144 compares the credit value f of the register Eg of the transmission circuit Tx-D (circuit III) with the credit value g of the register Ing of the reception circuit Rx-A (circuit IV), the transmission circuit Tx-D (circuit III) and the reception circuit Rx-A (circuit IV) which are connected with the communication path 30b that is determined to have a failure site. As a result of the comparison, in a case where the credit value f of the circuit III is the credit value g of the circuit IV or smaller (see "in case of "III-f"="IV-g" or "III-f"<"IV-g"" route in operation G6), the identification unit 144 determines that the CM #0 is the maintenance-targeted CM (operation G9).

In operation G10, the separation process or the rebooting process of the maintenance-targeted CM 10 is performed.

On the other hand, in a case where the credit value f of the circuit III is larger than the credit value g of the circuit IV (see "in case of "III-f">"IV-g"" route in operation G6), the maintenance-targeted CM may not be identified (operation G7).

In a case where the maintenance-targeted CM may not be identified as described above, either one of the CMs 10 is identified as the maintenance-targeted CM in accordance with the preset system design specification in operation G8. For example, identification of the maintenance-targeted CM is attempted by further applying another maintenance-targeted CM determination procedure such as assuming the CM 10 on the slave side as the maintenance-targeted CM. The above-described comparison and determination method in operation G6 may use either one of two kinds of procedures (a) and (b), which are described below.

(a) Time-Oriented Procedure

With respect to the plural credit values that are read out at the regular intervals in operation G3, the result that is most frequent in plural comparison results of the comparisons performed in operation G6 is employed as the final comparison result. For example, in a case where the credit values are read out for three times in operation G3, it is assumed that the result of "III-f"<"IV-g" is obtained for two times and the result of "III-f">"IV-g" is obtained for one time. In such a case, the result of "III-f"<"IV-g" that is more frequently obtained is employed as the final comparison result.

(b) Accuracy-Oriented Procedure

With respect to the plural credit values that are read out at the regular intervals in operation G3, the processes of operation G3 to G6 are repeatedly performed until the same result is continuously obtained for a prescribed frequency (for example, three times) or more in the plural comparison results of the comparisons performed in operation G6. In a case where the same result may not be obtained continuously (the result is not stable) even if a preset specific time elapses, a determination may be made by (a) time-oriented procedure. Alternatively, a determination may be made that the maintenance-targeted CM may not be identified (see operation G7), and the processing may move to operation G8.

Figure 10:
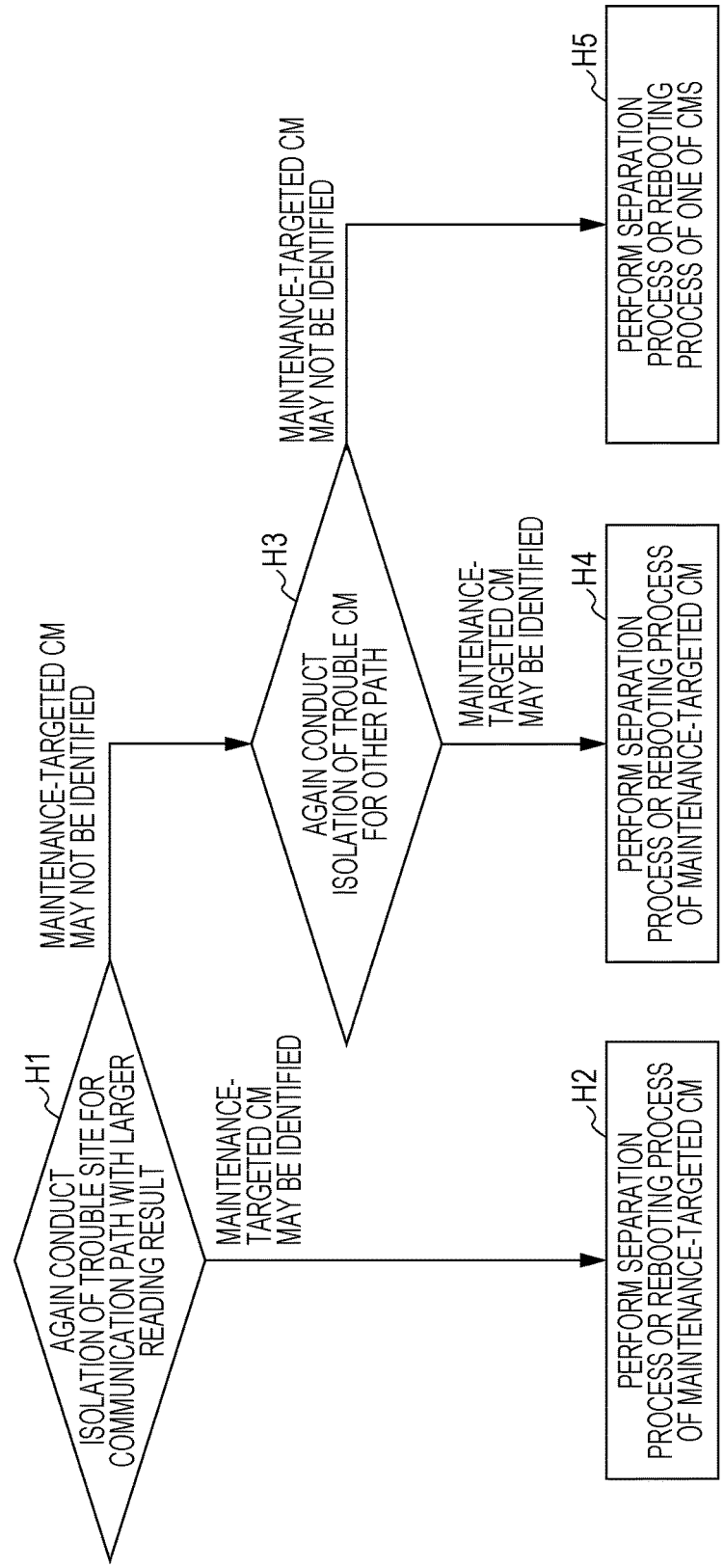
FIG. 10 is a flowchart for explaining a stepwise failure path identification procedure by the identification unit in the storage device as one example of the embodiment.
Figure 11:
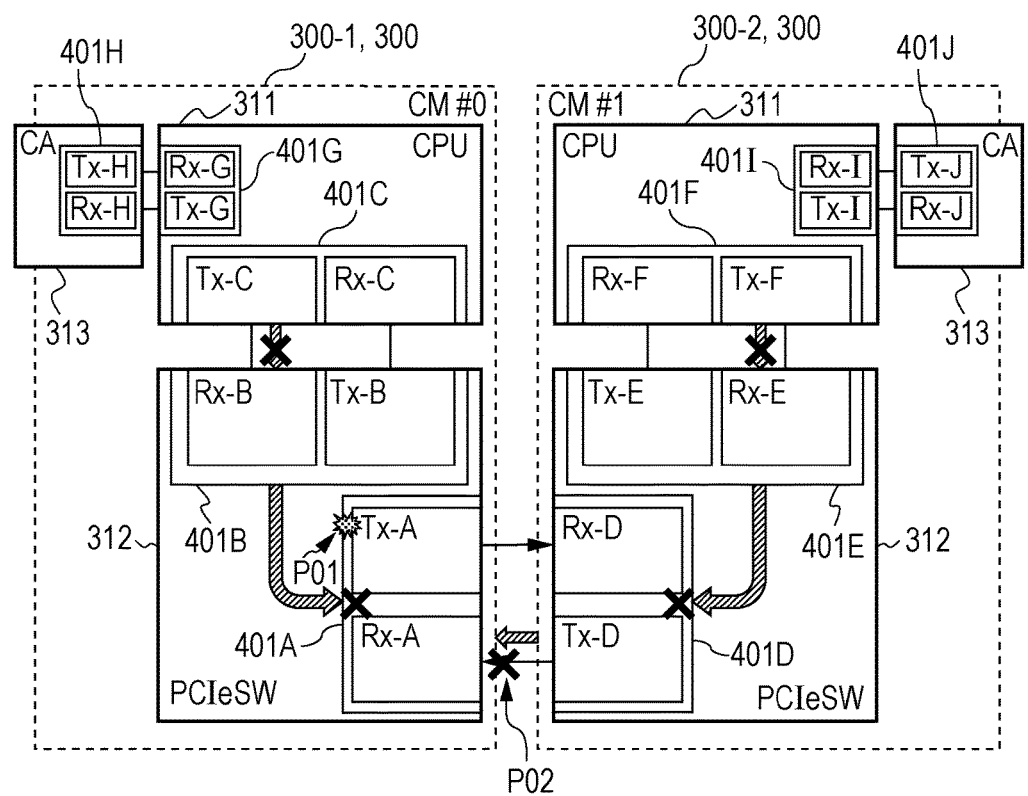
FIG. 11 is a diagram that illustrates the configuration of CMs included in a storage device in related art.

Next, the stepwise failure path identification procedure by the identification unit 144 of the storage device 1 as one example of the embodiment will be described following the flowchart (operations H1 to H5) illustrated in FIG. 10. In a case where the credit values exceed the alarm threshold value on both of the "I-II" side and the "III-IV" side in the comparison result of above-described operation F3 in FIG. 8, it is assumed that the failure path is unidentified, and the stepwise failure path identification, which will be described below, is performed.

Figure 8:
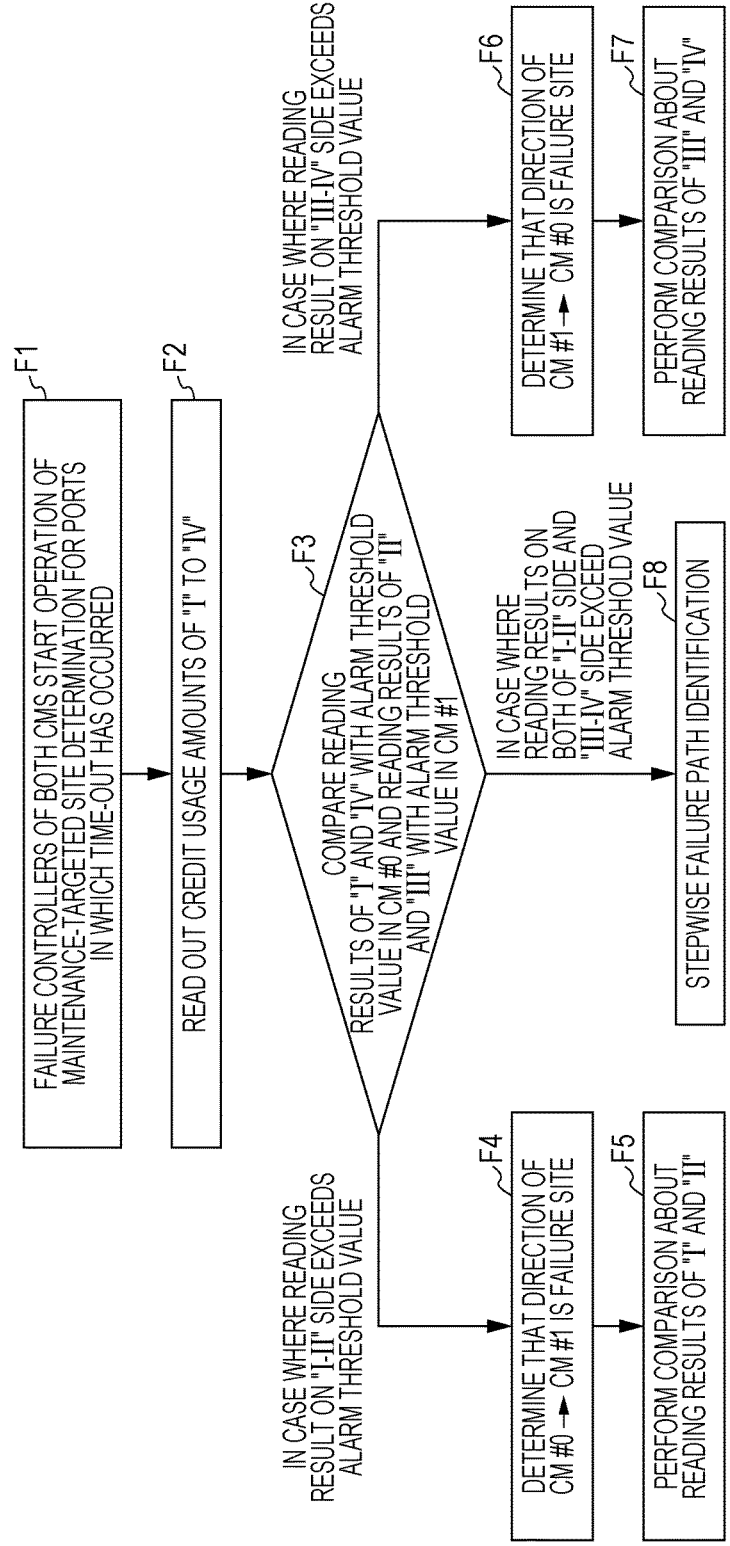
FIG. 8 is a flowchart for explaining an identification method of a failure path by the identification unit in the storage device as one example of the embodiment.
Figure 9:
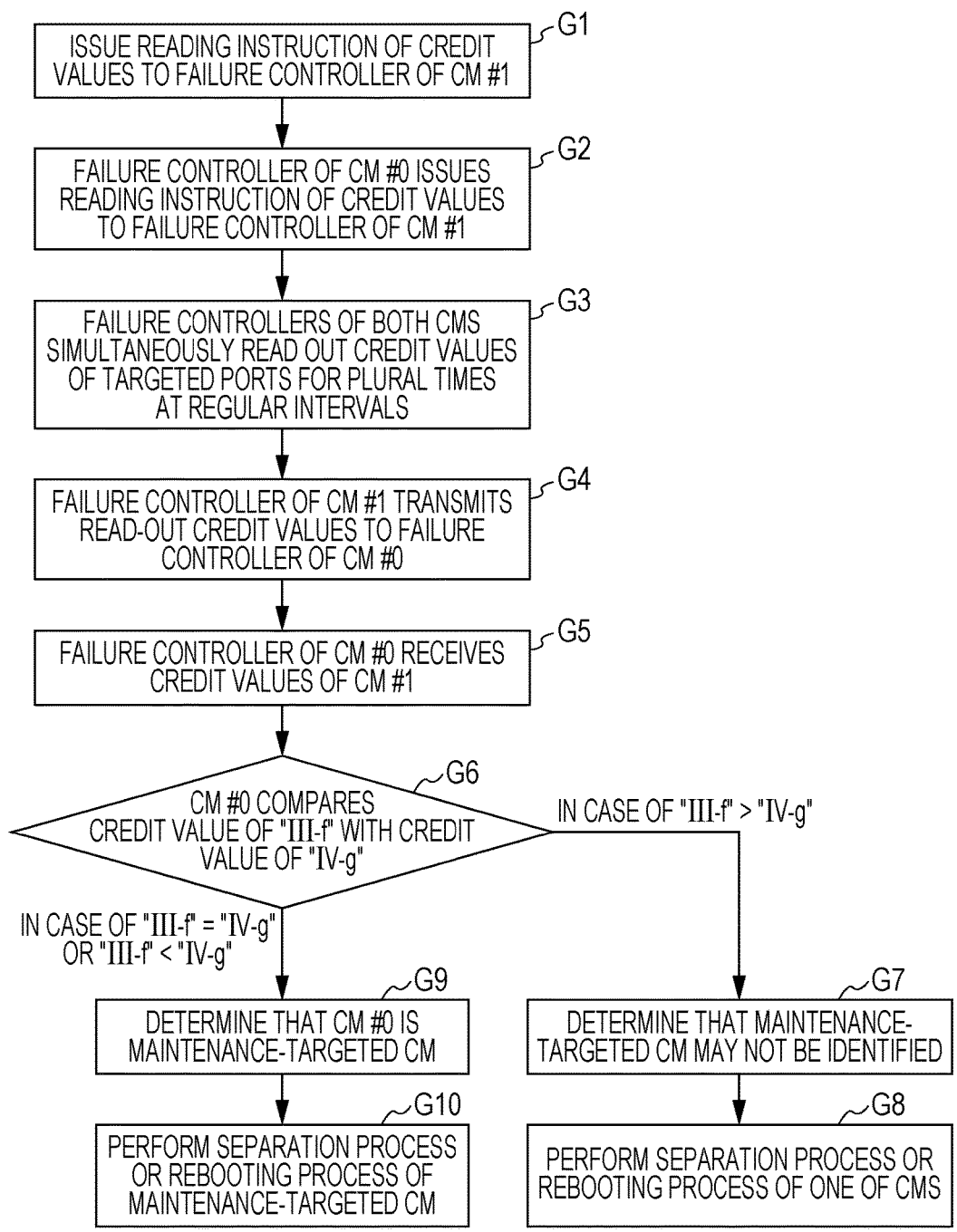
FIG. 9 is a flowchart for explaining identification processing of a trouble occurrence site by the identification unit in the storage device as one example of the embodiment.

In operation H1, presuming that the failure site is present in the communication path 30 with larger credit values between the first direction path 30a and the second direction path 30b based on the credit values of the registers Ing and Eg included in the failure predicted port pair, which are read out in operation F2 in FIG. 8, the identification processing of the trouble occurrence site illustrated in FIG. 9 is performed. As a result of the identification processing, in a case where the maintenance-targeted CM 10 may be identified (see "maintenance-targeted CM may be identified" route in operation H1), the separation process or the rebooting process of the maintenance-targeted CM 10 is performed in operation H2.

On the other hand, in a case where the maintenance-targeted CM 10 may not be identified (see "maintenance-targeted CM may not be identified" route in operation H1), in operation H3, the identification processing of the trouble occurrence site illustrated in FIG. 9 is performed presuming that the failure site is present in the communication path 30, which is not presumed to have the failure site in operation H1. As a result of the identification processing, in a case where the maintenance-targeted CM 10 may be identified (see "maintenance-targeted CM may be identified" route in operation H3), the separation process or the rebooting process of the maintenance-targeted CM 10 is performed in operation H4.

On the other hand, in a case where the maintenance-targeted CM 10 may not be identified (see "maintenance-targeted CM may not be identified" route in operation H3), in operation H5, either one of the CMs 10 is identified as the maintenance-targeted CM in accordance with the preset system design specification. As described above, in the storage device 1 as one example of the embodiment, the buffer management information obtainment unit 141 reads out the credit values of the registers Ing and Eg included in the ports 100 in the CM 10, and the buffer-full state prediction unit 142 predicts the occurrence of the buffer-full state of each of the buffers based on the credit values. When the buffer-full state prediction unit 142 detects the precursor of the buffer-full state, the regulation process unit 145 switches the CPU 11 of the same CM 10 into the regulated mode in which the buffer usage amount is regulated.

Accordingly, the occurrence of the buffer-full state may be avoided, and an occurrence of a machine-down situation due to the buffer-full state (credit depletion) may thereby be avoided. Further, in this case, the regulation process unit 145 performs the regulated mode notification to the CPU 11 by the interrupt notification via the interrupt signal line 15, and the CPU 11 may thereby be quickly switched into a buffer usage amount regulated mode. Accordingly, the maintenance-targeted CM 10 may be separated before fullness of the buffer actually occurs, and a system crash may thereby be avoided.

The failure determination unit 143 compares each of the plural credit values obtained at the regular intervals with the alarm cancellation threshold value Tac and thereby performs successive monitoring of the credit values. Then, the failure determination unit 143 determines whether or not the risk of the occurrence of the buffer-full state is removed based on the monitoring result. In a case where the risk of the occurrence of the buffer-full state is not removed, the failure determination unit 143 determines that hardware trouble has occurred in the storage device 1.

That is, the failure determination unit 143 performs successive monitoring of the credit values with respect to the port 100 in which the occurrence of the buffer-full state is predicted and thereby determines that hardware trouble has occurred in the storage device 1. This facilitates the failure determination unit 143 to determine that hardware trouble has occurred in the storage device 1.

Further, the identification unit 144 identifies the communication path in which the failure has occurred based on the credit values of the transmission circuit Tx and the reception circuit Rx included in the failure predicted port 100, with respect to the failure predicted port 100 in which the buffer-full state prediction unit 142 detects that the credit value exceeds the alarm threshold value Ta. Accordingly, identification of the failure occurrence site may easily be performed.

Further, the identification unit 144 identifies the maintenance-targeted CM 10 based on the magnitude relationship between the credit value of the register Eg of the transmission circuit Tx and the credit value of the register Ing of the reception circuit Rx, the transmission circuit Tx and the reception circuit Rx which configure the failure path. Accordingly, identification of the maintenance-targeted CM may easily be performed.

Further, the disclosed technology is not limited to the above-described embodiment, but various modifications may be practiced without departing the gist of this embodiment. The configurations and processes of this embodiment may be selected in accordance with purposes or may appropriately be combined.

For example, in the above-described embodiment, a description is made about the system configured with the PCIe bus. However, embodiments are not limited to this but may be applied to communication protocols other than the PCIe. Further, in the above-described embodiment, the failure controller 14 configured as the LSI is installed in the CM 10. However, embodiments are not limited to this, but various modifications may be practiced. For example, the function as the failure controller 14 may be realized by execution of a program by a processor such as the CPU 11. Further, the functions of the failure controller 14 may be installed in other apparatuses such as the CPU 11 and the PCIe switch 12.

In addition, in the above-described embodiment, the failure controller 14 included in the CM #0 collects the credit values in the CM #0, and the failure controller 14 included in the CM #1 collects the credit values in the CM #1. However, embodiments are not limited to this. That is, the failure controller 14 included in the CM #0 may collect the credit values in the CM #1, and the failure controller 14 of the CM #1 may collect the credit values in the CM #0.

Alternatively, the failure controller 14 may be included only in either one of the CM #0 and the CM #1, and this failure controller 14 may collect the credit values in the CM #0 and the CM #1. Further, this embodiment may be practiced and manufactured by persons having ordinary skill in the art by using the above-described disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system comprising:
   a first communication device configured to include first buffers to store data to be transmitted and received;
   a second communication device configured to include second buffers to store data to be transmitted and received; and
   a failure control device configured to include:
      a memory; and
      at least one processor, coupled to the memory, configured to:
         obtain buffer usage state information to indicate a state of use of each of the first buffers and the second buffers from each of the first communication device and the second communication device;
         identify a failure occurrence site on a channel, based on the obtained buffer usage state information; and
         identify a communication device that includes a storage unit on a reception side between the first communication device and the second communication device as the failure occurrence site in a case where credit information stored in the storage unit on the reception side is equal to or greater than credit information stored in a storage unit on a transmission side, with respect to a communication path identified as the communication path corresponding to the failure occurrence site,
   wherein the first communication device is configured to transmit and receive the data via the channel to and from the second communication device.

2. The communication system according to claim 1, wherein the at least one processor is further configured to read out credit information, as the buffer usage state information, that is stored in storage units included in communication ports of the first communication device and the second communication device.

3. The communication system according to claim 2, wherein
   the channel is configured to include a plurality of communication paths, and
   the at least one processor is further configured to identify the communication path corresponding to the failure occurrence site from the plurality of communication paths, based on the credit information stored in the storage unit provided for each of the communication paths, in the first communication device and the second communication device.

4. The communication system according to claim 3, wherein the at least one processor is further configured to identify the communication path corresponding to the storage unit storing the credit information greater than a first threshold value as the communication path corresponding to the failure occurrence site in a case where the credit information regarding any one of the plurality of communication paths is greater than the first threshold value.

5. The communication system according to claim 4, wherein
   in a case where the credit information is greater than the first threshold value in two or more communication paths,
   the at least one processor is further configured to determine whether or not a value of the credit information stored in the storage unit on the reception side is equal to or greater than a value of the credit information stored in the storage unit on the transmission side, from the communication path corresponding to the storage unit storing the credit information with the greater value with respect to the two or more communication paths, and
   in a case where the credit information stored in the storage unit on the reception side is equal to or greater than the credit information stored in the storage unit on the transmission side,
   the at least one processor is further configured to identify the communication device including the storage unit on the reception side between the first communication device and the second communication device as the failure occurrence site.

6. The communication system according to claim 2, wherein the at least one processor is further configured to:
   predict an occurrence of a buffer-full state in each of the first buffers and the second buffers, based on the obtained credit information; and
   switch a control device into an operation mode in which a buffer usage amount is regulated in a case where the at least one processor predicts the occurrence of the buffer-full state.

7. The communication system according to claim 6, wherein the at least one processor is further configured to:
   make a determination of an occurrence of failure related to the communication port in a case where the at least one processor compares the credit information in the communication port obtained after a prescribed time elapses with a prescribed second threshold value and detects that the credit information is greater than the second threshold value, with respect to the communication port in which the at least one processor predicts the occurrence of the buffer-full state.

8. The communication system according to claim 7, wherein the at least one processor is further configured to determine that a risk of the occurrence of the buffer-full state is removed in a case where the at least one processor compares the credit information included in the port in which the at least one processor predicts the occurrence of the buffer-full state with the second threshold value for plural times and detects that the credit information is equal to or less than the second threshold value continuously for specific times.

9. A failure control device included in a communication system configured to include a first communication device configured to include first buffers to store data to be transmitted and received and a second communication device configured to include second buffers to store data to be transmitted and received, the first communication device being configured to transmit and receive the data via a channel to and from the second communication device, the failure control device comprising:
a memory; and
at least one processor, coupled to the memory, configured to:
obtain buffer usage state information to indicate an usage state of each of the first buffers and the second buffers from each of the first communication device and the second communication device;
identify a failure occurrence site on the channel, based on the obtained buffer usage state information; and
identify a communication device that includes a storage unit on a reception side between the first communication device and the second communication device as the failure occurrence site in a case where credit information stored in the storage unit on the reception side is equal to or greater than credit information stored in a storage unit on a transmission side, with respect to a communication path identified as the communication path corresponding to the failure occurrence site.

10. The failure control device according to claim 9, wherein the at least one processor is further configured to read out credit information, as the buffer usage state information, that is stored in storage units included in communication ports of the first communication device and the second communication device.

11. The failure control device according to claim 10, wherein
the channel is configured to include a plurality of communication paths, and
the at least one processor is further configured to identify the communication path corresponding to the failure occurrence site from the plurality of communication paths, based on the credit information stored in the storage unit provided for each of the communication paths, in the first communication device and the second communication device.

12. The failure control device according to claim 11, wherein the at least one processor is further configured to identify the communication path corresponding to the storage unit storing the credit information greater than a first threshold value as the communication path corresponding to the failure occurrence site in a case where the credit information regarding any one of the plurality of communication paths is greater than the first threshold value.

13. The failure control device according to claim 12, wherein
in a case where the credit information is greater than the first threshold value in two or more communication paths,
the at least one processor is further configured to determine whether or not a value of the credit information stored in the storage unit on the reception side is equal to or greater than a value of the credit information stored in the storage unit on the transmission side, from the communication path corresponding to the storage unit storing the credit information with the greater value with respect to the two or more communication paths, and
in a case where the credit information stored in the storage unit on the reception side is equal to or greater than the credit information stored in the storage unit on the transmission side,
the at least one processor is further configured to identify the communication device including the storage unit on the reception side between the first communication device and the second communication device as the failure occurrence site.

14. The failure control device according to claim 10, wherein the at least one processor is further configured to:
predict an occurrence of a buffer-full state in each of the first buffers and the second buffers, based on the obtained credit information; and
switch a control device into an operation mode in which a buffer usage amount is regulated in a case where the at least one processor predicts the occurrence of the buffer-full state.

15. The failure control device according to claim 14, wherein the at least one processor is further configured to:
make a determination of an occurrence of failure related to the communication port in a case where the failure at least one processor compares the credit information in the communication port obtained after a prescribed time elapses with a prescribed second threshold and detects that the credit information is greater than the second threshold value, with respect to the communication port in which the at least one processor predicts the occurrence of the buffer-full state.

16. The failure control device according to claim 15, wherein the at least one processor is further configured to determine that a risk of the occurrence of the buffer-full state is removed in a case where the at least one processor compares the credit information included in the port in which the at least one processor predicts the occurrence of the buffer-full state with the second threshold value for plural times and detects that the credit information is equal to or less than the second threshold value continuously for specific times.

17. A failure control method by a failure control device included in a communication system configured to include a first communication device configured to include first buffers to store data to be transmitted and received and a second communication device configured to include second buffers to store data to be transmitted and received, the first communication device being configured to transmit and receive the data via a channel to and from the second communication device, the failure control method comprising:
obtaining buffer usage state information to indicate an usage state of each of the first buffers and the second buffers from each of the first communication device and the second communication device;
identifying a failure occurrence site in the channel, based on the obtained buffer usage state information; and
identifying a communication device that includes a storage unit on a reception side between the first communication device and the second communication device as the failure occurrence site in a case where credit information stored in the storage unit on the reception side is equal to or greater than credit information stored in a storage unit on a transmission side, with respect to a communication path identified as the communication path corresponding to the failure occurrence site.

18. The failure control method according to claim 17, further comprising:
    reading out credit information, as the buffer usage state information, that is stored in storage units included in communication ports of the first communication device and the second communication device.

* * * * *